(12) United States Patent
Claiborne et al.

(10) Patent No.: US 6,738,150 B1
(45) Date of Patent: May 18, 2004

(54) METHODS AND SYSTEMS FOR PROCESSING IMAGE DATA

(75) Inventors: Steven J. Claiborne, Meridian, ID (US); Dellas G. Frederiksen, Boise, ID (US); Chris R. Gunning, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/292,044

(22) Filed: Apr. 14, 1999

(51) Int. Cl.[7] .......................... G06F 15/00; G09G 5/00; G09G 29/46
(52) U.S. Cl. ...................... 358/1.11; 358/1.15; 345/788; 345/801; 400/708; 400/76
(58) Field of Search .............................. 358/1.16, 1.15, 358/1.12, 1.11, 296, 435, 436, 439, 1.14; 400/708, 76; 345/788, 801

(56) References Cited

U.S. PATENT DOCUMENTS

| 4,581,710 A | * | 4/1986 | Hasselmeier ................ 364/523 |
| 5,450,562 A | | 9/1995 | Rosenberg et al. ......... 395/446 |
| 5,459,818 A | | 10/1995 | Grant et al. ................ 395/114 |
| 5,479,587 A | * | 12/1995 | Campbell et al. .......... 358/1.17 |
| 5,864,332 A | * | 1/1999 | Young ....................... 345/127 |
| 5,946,458 A | * | 8/1999 | Austin et al. ............... 395/114 |
| 5,957,600 A | * | 9/1999 | Ju .............................. 400/708 |
| 5,978,560 A | * | 11/1999 | Tan et al. ................... 395/114 |
| 6,018,400 A | * | 1/2000 | Blair ........................... 358/1.9 |
| 6,046,818 A | * | 4/2000 | Benson ...................... 358/1.18 |
| 6,046,820 A | * | 4/2000 | Konishi ...................... 358/1.9 |
| 6,192,157 B1 | * | 2/2001 | Prebble ..................... 382/239 |
| 2001/0040699 A1 | * | 11/2001 | Osawa et al. ............. 358/1.17 |

* cited by examiner

Primary Examiner—Kimberly Williams
Assistant Examiner—Saeid Ebrahimi (57) ABSTRACT

Methods and systems for processing image data in connection with peripheral units such as laser printers are described. In one embodiment, an image pipeline is queried to determine at least one constraint which affects the image data provided to the image pipeline from a source of image data. If appropriate, the constraint(s) is imposed on the image data to provide constrained image data. After the constraint is imposed on the image data, the constrained image data is provided from the source to the image pipeline for processing into a page-arranged output. In another embodiment, image data which is provided by a source is stored in a first buffer. A handle is assigned to the image data. The handle is passed through at least a portion of the image pipeline. After such passing, at least a portion of the image data which was stored in the first buffer is copied directly into at least one strip buffer, with such copying being the first copying of the image data after the storing thereof in the first buffer. Other embodiments are described.

20 Claims, 7 Drawing Sheets

FIG. 1

FIG. 8B

METHODS AND SYSTEMS FOR PROCESSING IMAGE DATA

This invention was made with government support under Grant Number N00014-94-1-0787 awarded by the Department of the Navy. The government has certain rights to the invention.

FIELD OF THE INVENTION

This invention pertains to methods and systems for processing image data.

BACKGROUND OF THE INVENTION

In the past, printers have typically captured an entire page before any image is placed on paper. In such printers, formatting is either performed on the host computer (with large volumes of rasterized data being shipped to the printer), or on a formatter within the printer. Since a laser printer print engine operates at a constant speed, if new rasterized data is not available at a rate that keeps up with the engine's operation, a print "overrun" occurs and the page is not printable. Various methods for addressing print overrun situations are described in U.S. Pat. No. 5,479,587, the disclosure of which is incorporated by reference herein. Various other aspects of printers are described in the following U.S. patents, the disclosures of which are incorporated by reference: U.S. Pat. Nos. 5,450,562, and 5,459,818.

Figure 1:
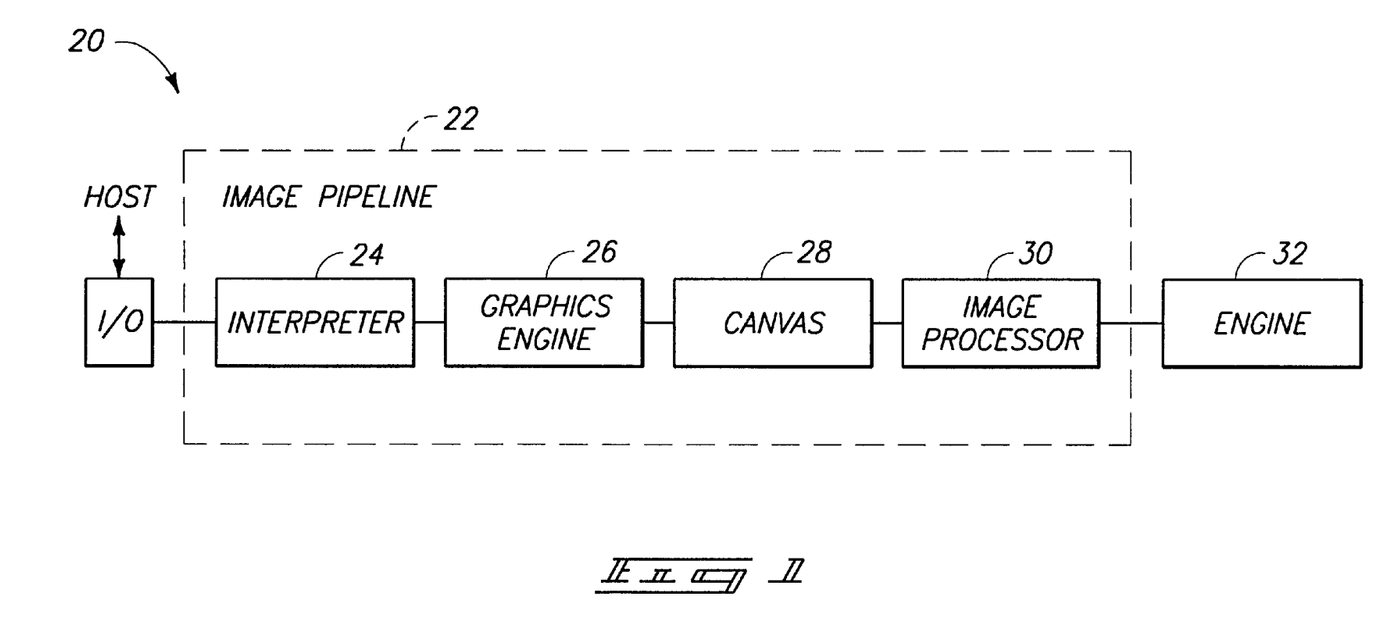
FIG. 1 is a high level block diagram of an image pipeline suitable for use in processing image data provided by a source.

For purposes of understanding various problems associated with past processing techniques relative to printers and the like, a somewhat high level block diagram describing a system configured to process image data is shown generally at 20 in FIG. 1. System 20 typically includes a so-called image pipeline which processes image data provided by a host into a form which is suitable for use by a printer engine. The image pipeline comprises a number of different elements which can be implemented in any suitable hardware, software, or firmware. In this example, image pipeline 22 includes an interpreter 24, a graphics engine 26, a canvas 28, and an image processor 30. An engine 32 is provided and comprises, in this example, a print engine such as would be found in a laser printer.

Typically, an image or a file gets sent to system 20 via an I/O port (not specifically designated). In a typical personal computer scenario, a print job will load through an operating system such as Windows, to a driver and will be sent out a parallel port. The print job need not, however, come from a personal computer. Rather, it can come from a mainframe, from work stations, or from other devices. In addition, it need not have parallel porting. Rather, it can come through infrared ports or LANs that show other I/O type ports, to name just a few. The print job is received by interpreter 24 which then operates upon the print job in a known manner. At the interpreter level, the print job is parsed and a job stream is formed to determine what operations are being specified. Interpreter 24 is in communication with graphics engine 26 and communicates to the graphics engine what operations are being specified. Graphics engine 26 operates on information received from interpreter 24 by doing such things as ensuring that the information does or does not have to be clipped, Additionally, if a particular structure specified by interpreter 24 needs to be filled, it determines what area has to be filled and the like. If a particular structure specified by interpreter 24 needs to be stroked, it determines what area and what objects are to be used for stroking.

Canvas 28 is provided and is in operable contact with graphics engine 26. The graphics engine 26 sends the resulting object to canvas 28 for processing. The graphics engine 26 communicates to canvas 28 a description of the object it has operated upon. Canvas 28 breaks up information received from the graphics engine into smaller amounts of data. In this example these smaller amounts of data are known as strips. Accordingly, at the canvas level, work requests are built and each work request is associated to a strip.

Image processor 30 is coupled with canvas 28 and will eventually receive the work requests from canvas 28 and start imaging them or rendering them into bits. The rendering of strips into bits results in formation of a raster bit map. The raster bit map is used to drive print engine 32 for rendering an image. The above description constitutes but one exemplary system which can be utilized to process image data into a form suitable for use by a print engine. More detailed information about the operation of systems, such as system 20, can be found in the patents incorporated by reference above. In addition, while the interpreter 24, graphics engine 26, canvas 28, and image processor 30 are shown as discrete elements, such need not be the case.

Problems can occur in the image pipeline because of the different nature of the information or data the elements process. For example, problems can occur at the graphics engine 26 and canvas 28 levels pertaining to the complexity levels at which each element is designed to handle the associated data it receives. For example, canvas 28 works at a fairly low primitive level. Hence, optimal or desirable operation within the canvas functionality is attained when the information or data received thereby is in a very simple format. The graphics engine 26, on the other hand, operates at a fairly high level or in a very sophisticated format. Resultingly, in the translation from the sophisticated format of graphics engine 26 to the simplistic format of canvas 28, one can experience a data explosion.

For example, at the top end of graphics engine 26, one may be directed to draw a circle which is specified by a point and a radius. At the bottom end of graphics engine 26, canvas 28 does not understand that particular definition of a circle, so the circle definition is broken into a number of so-called trapezoids through processing techniques known as polygon decomposition. Accordingly, the circle is broken into n number of primitives. Those primitives can be rectangles, trapezoids, and what are referred to as x and/or y line scans. Hence, a typical circle might break into perhaps 200 or 300 basic objects. This is where a real problem can occur because, essentially, a data explosion results by converting from one format to another.

Prior solutions to the above-identified problems have included compressing raster data across the I/O interface and/or tuning the image pipeline to keep up with existing I/Os, but not placing constraints on the raster image data coming into the printer.

With respect to the compression solutions, such can, in some instances, involve simply taking an image or a page-ready scan, and compressing it with little or no understanding of what device will be used to ultimately process it. In this instance, no optimization is used at all since, simply, a blind compression of the image is conducted which is subsequently sent off to the printer or scanner. Accordingly, the device must then decompress the compressed data and operate upon it to get it ready for the imaging pipeline. Disadvantages to this solution are that to print the raster data at an appropriate engine speed, additional hardware is required at, the data source and in the printer to perform compression and decompression. Additionally, some source images, especially halftoned scanned data can be "noisy" and may not compress very well. As a result, many of these types of pages will not print at engine speed.

With respect to the tuning of the image pipeline without constraining raster image data, such typically involves the device itself getting involved in the breaking of the image into strips, insuring that the data is properly clipped and/or otherwise processed. Hence, every time a pixel is manipulated by the device, the whole system slows down. This can significantly slow throughput. A disadvantage of this approach is that more processing, and hence overhead, is required in the printer to format the data into engine-ready format. A faster printer controller would be needed to keep up with I/O rates of 7.5 MB/sec than what is currently used in some current 32 page-per-minute (ppm) wide-format printer engines.

Accordingly, this invention arose out of problems associated with improving the efficiency with which high-bandwidth image data is handled in a peripheral unit's, and particularly a printer's image pipeline.

SUMMARY OF THE INVENTION

Methods and systems for processing image data in connection with peripheral units such as laser printers are described.

In one embodiment, an image pipeline is queried to determine at least one constraint which affects the image data provided to the image pipeline from a source of image data. If appropriate, the constraint(s) is imposed on the image data to provide constrained image data. After the constraint is imposed on the image data, the constrained image data is provided from the source to the image pipeline for processing into a page-arranged output.

In another embodiment, image data which is provided by a source is stored in a first buffer. A handle is assigned to the image data. The handle is passed through at least a portion of the image pipeline. After such passing, at least a portion of the image data which was stored in the first buffer is copied directly into at least one strip buffer, with such copying being the first copying of the image data after the storing thereof in the first buffer.

In another embodiment, a peripheral unit for producing a print media having printed matter thereon is provided. The peripheral unit includes a source comprising a query processor, with the source being configured to provide image data describing an image. An image pipeline is provided and is operably coupled with the source and is configured to receive the image data therefrom and process the image data into a page-arranged output. The image pipeline has at least one constraint which affects the image data provided by the source. The query processor is preferably configured to query the image pipeline to ascertain the constraint prior to providing the image data to the image pipeline.

Other features and advantages of the invention will become apparent to those of ordinary skill in the art upon review of the following detailed description, claims, and drawings.

DETAILED DESCRIPTION OF THE INVENTION

Figure 2:
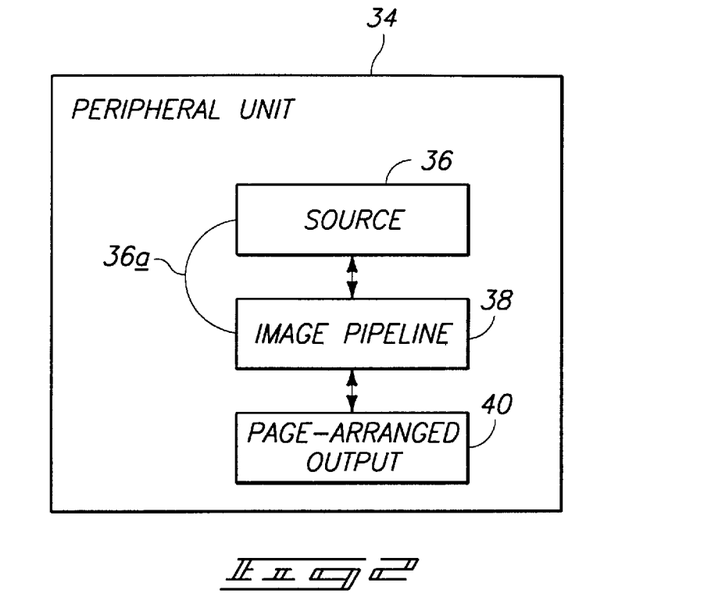
FIG. 2 is a high level schematic diagram of a peripheral unit in accordance with one or more embodiments of the present invention.

Referring to FIG. 2, a peripheral unit 34 is provided and is configured to convert image data to page-arranged output. Preferably, peripheral unit 34 includes a source 36 which provides the image data, and an image pipeline 38 which processes the image data into a page-arranged output 40.

Image pipeline 38 has at least one constraint which affects the image data provided by source 36. Exemplary constraints which can affect the image data provided by the source include page width—such as the width of a strip buffer in pixels rounded up based on the alignment of rows in a strip, the height of a strip buffer in rows, and the height of a page in rows. A "row" can be considered as a single line of pixels, one pixel high. These constraints or values depend upon the size and/or orientation of a printed page. These values or constraints can also change in accordance with the media being printed upon. In addition, these constraints or values are given for exemplary purposes only and are not intended to be limiting in any way. Accordingly, other constraints or values can be utilized.

Figure 3:
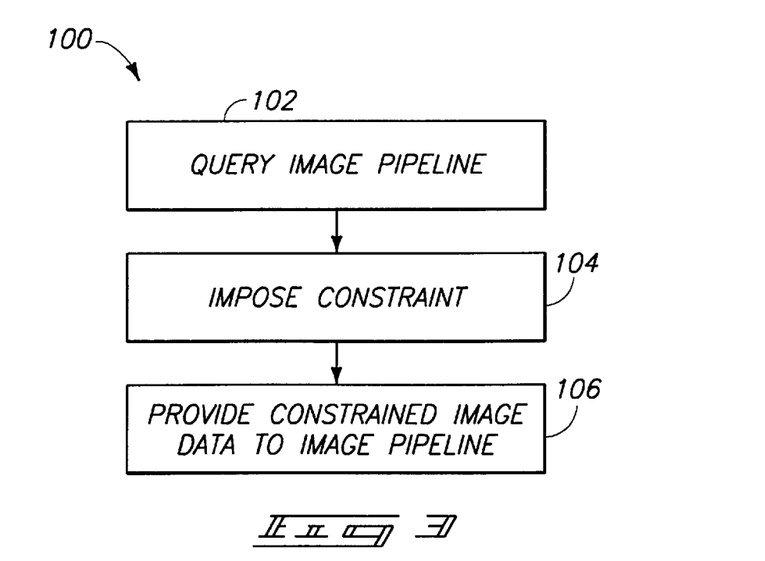
FIG. 3 is a flow diagram describing one or more methods in accordance with one or more embodiments of the invention.

Referring to FIG. 3, certain methodical aspects of one embodiment of the present invention are shown generally at 100. These steps can be implemented in any suitable hardware, software or firmware. At 102, the image pipeline, such as image pipeline 38 in FIG. 2, is queried to determine at least one constraint. Preferably, the image pipeline is queried to determine a plurality of constraints, such as those described above. At 104, if appropriate, the constraint is imposed on the image data to provide so-called constrained image data. At 106, and after the constraint is imposed on the data, the constrained image data is provided from the source to the image pipeline for processing into the page-arranged output. In one embodiment, the querying takes place at the beginning of each and every copy page being processed. Accordingly, the image pipeline is queried and constraints for each particular page are determined. Hence, one aspect of the invention provides for a dynamic adjustment relative to each page. For example, a legal-sized page will have different constraints than a regular letter-sized page. Aspects of the present invention provide for an adjustment relative to each different page.

In addition, various embodiments of the invention can make appropriate adjustments to the image data, at the front end, prior to processing in the image pipeline, relative to a so-called dot per inch mode. For example, constraints placed upon a page when a printer is placed into a 600 dots-per-inch (dpi) mode are different from those placed upon a page when a printer is placed into a 1200 dpi mode. All of this information, according to various embodiments of the invention, can be discovered and acted upon prior to processing through the image pipeline. This enables a reduction in processing overhead relative to the image pipeline.

In one embodiment, the querying of the image pipeline takes place by providing a communication link 36a (FIG. 2) between source 36 and image pipeline 38. The querying preferably takes place over communication link 36a. The link can be implemented in any suitable hardware, software or firmware.

Figure 4:
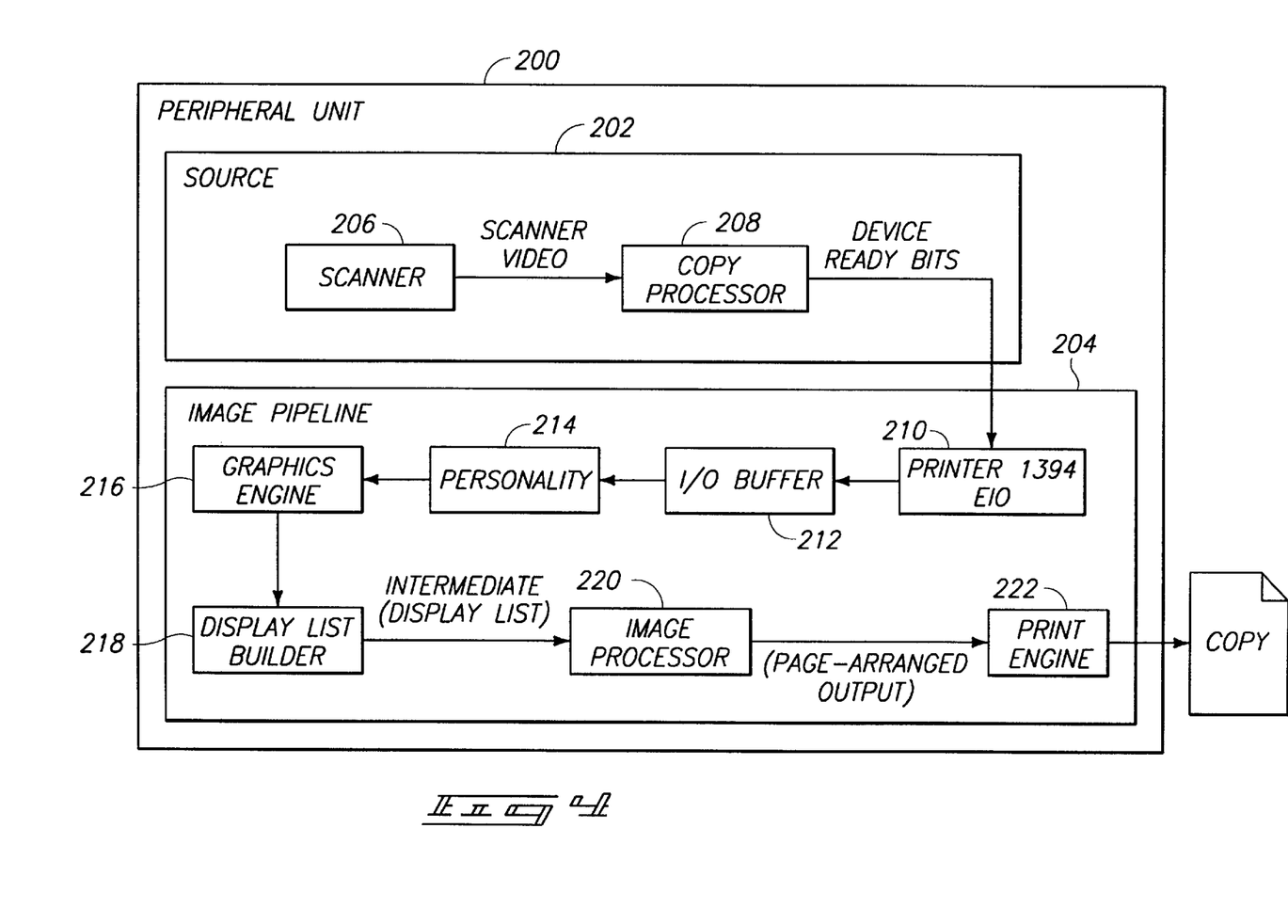
FIG. 4 is a schematic diagram of a peripheral unit in accordance with one or more embodiments of the present invention.

Referring to FIG. 4, one particular type of peripheral unit is shown at 200. Peripheral unit 200 includes a source 202 and an image pipeline 204. Source 202 preferably generates raster image data at data rates comparable to the printer engine speed. In the illustrated example, source 202 comprises a scanner 206 and a copy processor 208. Copy processor 208 can prepare constrained raster image data ("device ready bits") which is subsequently transferred over an I/O connection to image pipeline 204. In one embodiment, scanner 206 is a 32 pages-per-minute, wide-format duplex scanner (Digital Copy 320). Digital Copy 320 includes a copy processor card (copy processor 208) which performs image processing functions to convert 8 bits pert pixel (bpp) scanner data into halftoned data. The copy processor can be installed in a slot in the scanner and it attaches to the printer using an IEEE-1394 interface 210. Image data from copy processor 208 is output at up to 7.5 MB/sec. This rate can be calculated based on image resolution, pixel depth, and interpage gap times. This rate is over an order of magnitude higher than that supported by previous LaserJet I/O implementations.

Image data which is transferred into image pipeline 204 is initially stored in buffers 212. Buffers 212 are managed by the I/O subsystem 210. As data is placed in the I/O buffers 212, I/O subsystem 210 notifies the personality support subsystem 214 that input data is available. Personality support subsystem, in turn, communicates to additional subsystems such as graphics engine 216, and display list builder 218 to convert this data to a suitable format to store on a display list. For unconstrained raster data, this conversion may include scaling and clipping the image data. For constrained raster data, this conversion is not required. An image processor 220 is provided and functions in much the same way as described above. Image processor 220 is operably connected with and drives a print engine 222 in accordance with known processing techniques.

In one embodiment of the present invention, image pipeline 204 includes a display list builder 218 which processes the image data into individual strips having at least one strip parameter. Exemplary strip parameters were discussed above and include strip dimensions as dictated by strip buffer widths, strip buffer height, and height of a page. Image processor 220 renders the individual strips into a raster bit map. In accordance with one preferred embodiment, the querying of image pipeline 204 comprises determining at least one, and preferably more of the strip parameters of the display list builder 218. The strip parameters can then be imposed on the image data prior to provision of the image data to the image pipeline.

Figure 5:
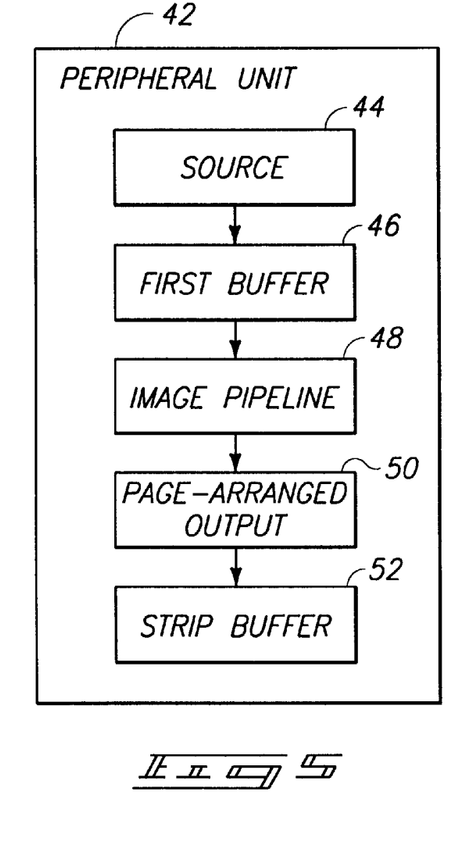
FIG. 5 is a high level schematic diagram of a peripheral unit in accordance with one or more embodiments of the present invention.

Referring to FIG. 5, and in accordance with another embodiment of the present invention, a peripheral unit is provided at 42. Peripheral unit 42 preferably converts image data to page-arranged output as described above. Peripheral unit 42 includes a source 44 which provides constrained or unconstrained image data. A first buffer 46 is provided for storing the constrained or unconstrained image data. An image pipeline 48 is provided and processes the constrained or unconstrained data into a page-arranged output 50. At least one strip buffer 52 is provided for storing the page-arranged output.

Figure 6:
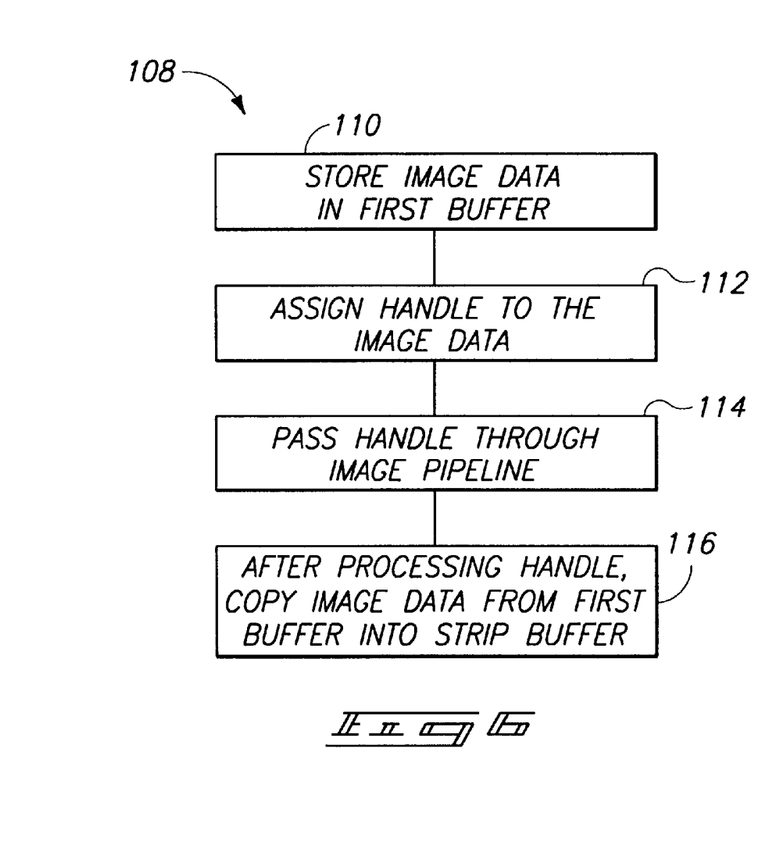
FIG. 6 is a flow diagram describing one or more methods in accordance with one or more embodiments of the invention.

Referring to FIG. 6, and in accordance with one embodiment of the present invention, an image data processing method is shown generally at 108. Such method can be implemented in any suitable hardware, software, or firmware. At 110 image data provided by the source is stored in a first buffer 46 (FIG. 5). At 112, a handle is assigned to the image data. A "handle" can be considered as a pointer or a reference to the data which is stored in first buffer 46. At 114, the handle is passed through at least a portion of image pipeline 48. After passing the handle through at least a portion of image pipeline 48, at least a portion of the image data which was stored on first buffer 46 is copied, at 116, directly into strip buffer 52. Preferably, the copying of the image data from first buffer 46 into strip buffer 52 is the first such copying of the image data after it has been stored in first buffer 46. By processing the image data as described above, at least one or more copying steps, wherein the entire image data contents which are stored in first buffer 46 were formerly copied through to the various processing stages in the image pipeline, are avoided. This greatly reduces processing complexities and overhead requirements.

In one embodiment, image pipeline 48 includes a display list builder such as display list builder 218 in FIG. 4. Display list builder 218 preferably builds a display list describing data which is to be provided into the page-arranged output. In a preferred embodiment, passing of the handle through at least a portion of the image pipeline comprises storing the handle on the display list. In another embodiment, display list builder 218 is configured to build a display list comprising a plurality of strips having at least one strip parameter comprising a constraint which affects the image data provided by source 44 (202). In accordance with one preferred embodiment, at least one, and preferably more strip parameters are determined prior to passing the handle through at least a portion of the image pipeline. In another embodiment, the strip parameter which is determined prior to passing the handle through the image pipeline portion, is used and imposed, if appropriate, on the image data to provide constrained image data.

In another embodiment, the display list builder builds a display list comprising a plurality of strips having at least one strip parameter comprising a constraint which affects the image data provided by the source. At least one, and preferably more strip parameters are determined prior to storing the image data in first buffer 46. Preferably, the determined strip parameter(s) are used and imposed, if appropriate, on the image data to provide constrained image data. In another embodiment, image pipeline 48 is queried to determine at least one, and preferably more strip parameters prior to passing the handle through at least a portion of the image pipeline. In this embodiment, the strip parameter(s) is used and imposed, if appropriate, on the image data to provide the constrained image data.

Figure 7:
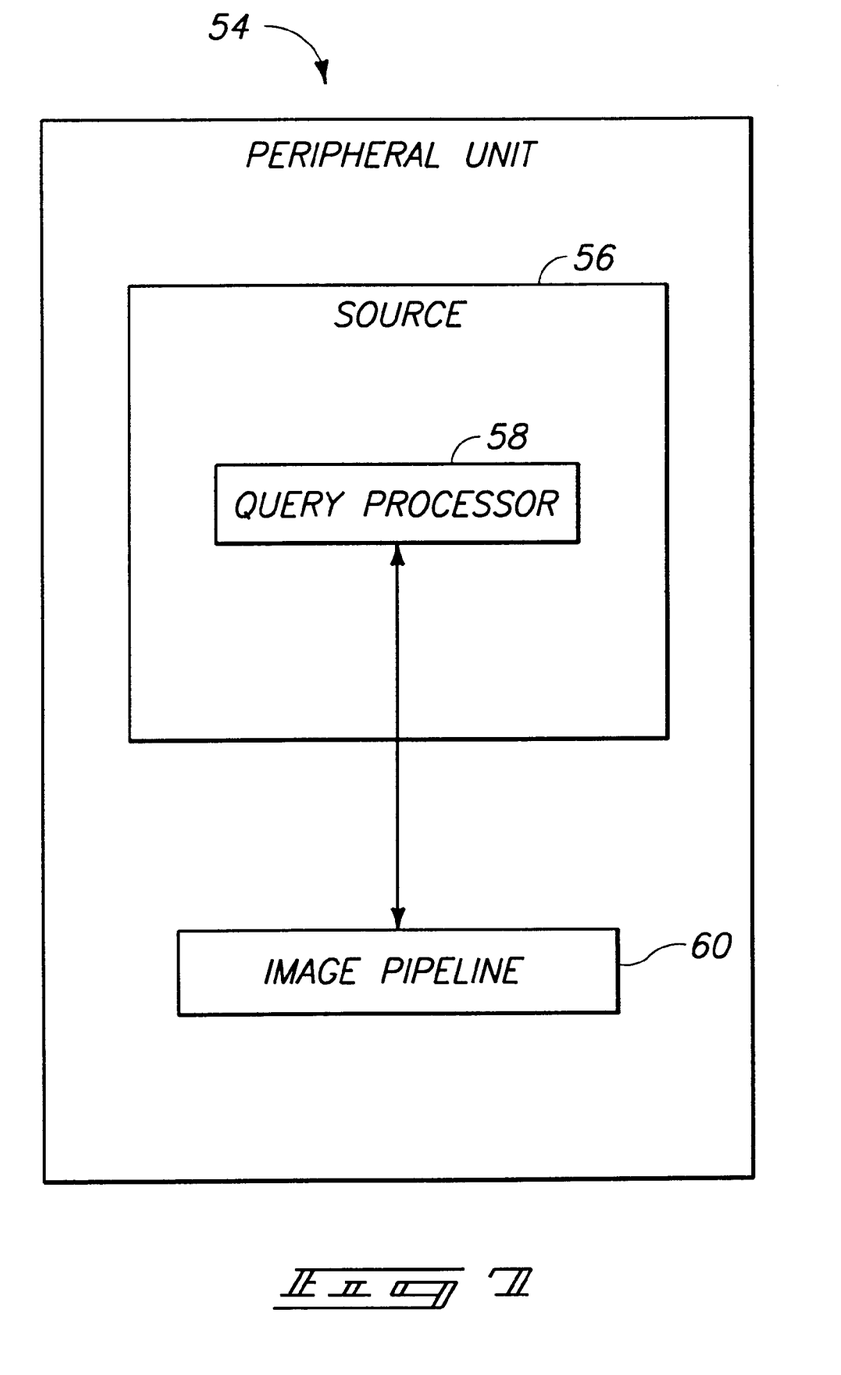
FIG. 7 is a high level schematic diagram of a peripheral unit in accordance with one or more embodiments of the present invention.

Referring to FIG. 7, a peripheral unit for producing a print media having printed matter thereon in accordance with another embodiment of the present invention is shown generally at 54. Peripheral unit 54 preferably includes a source 56 comprising a query processor 58. Source 56 is preferably configured to provide image data describing an image as set forth above. An image pipeline 60 is provided and is operably coupled with source 56. Preferably, image pipeline 60 is configured to receive image data from source 56 and process the image data into a page-arranged output. Image pipeline 60 has at least one constraint which affects the image data provided by source 56. Preferably, query processor 58 is configured to query the image pipeline 60 to ascertain at least one, and preferably more constraints prior to providing image data to image pipeline 60. Source 56, query processor 58, and image pipeline 60 can be implemented in any suitable hardware, software, or firmware.

In one embodiment, source 56 is further configured to impose at least one constraint on the image data prior to providing the image data to image pipeline 60. In another embodiment, image pipeline 60 includes a display list builder apparatus, such as display list builder 218 (FIG. 4) which is configured to process image data into individual strips having at least one strip parameter. In addition, image pipeline 60 preferably includes an image processor, such as image processor 220 (FIG. 4) which is configured to render the individual strips into a raster bit map. Query processor 58 is configured to ascertain at least one and preferably more strip parameters, such as those strip parameters described above. In another embodiment, peripheral unit 54 includes a first buffer, such as first buffer 46 (FIG. 5) which is coupled with source 56 and image pipeline 60. The first buffer is preferably configured to hold image data provided by the source. The peripheral unit also includes at least one handle which is assigned to the image data which is held in first buffer 46. Image pipeline 60 is preferably configured to pass the handle which describes the image data, rather than the image data itself. A strip buffer, such as strip buffer 52, is provided and coupled with first buffer 46 and is preferably configured to receive image data directly from the first buffer responsive to processing by the image pipeline.

Figure 8:
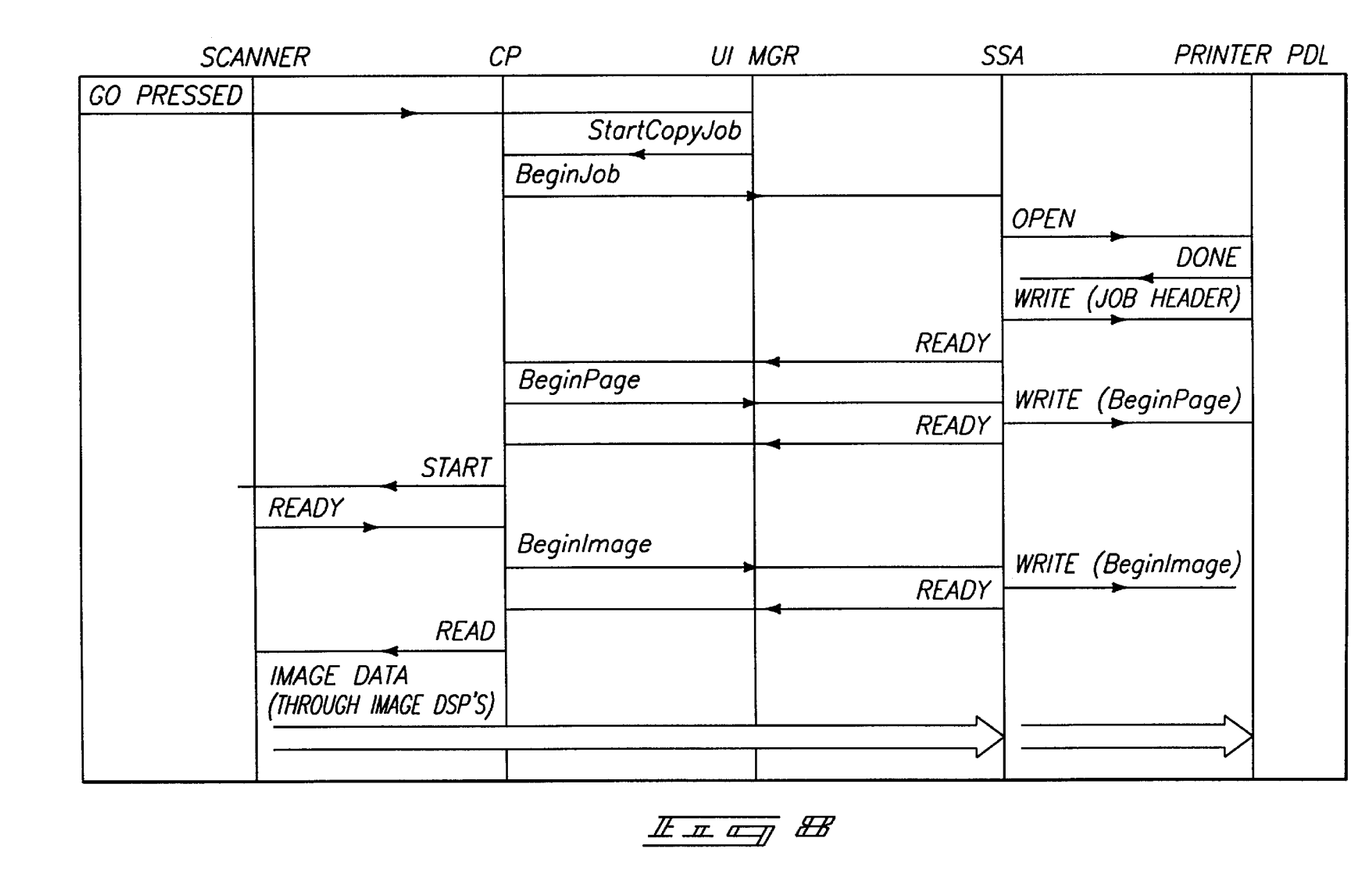
FIG. 8 is a communication flow diagram which is useful in understanding certain embodiments of the invention.

To assist in further understanding various embodiments of the invention described above, a communication flow diagram is provided in FIG. 8. The communication flow diagram describes one way in which communication is effected between the source and the image pipeline. For definitional purposes, the "UI Manager" is the User Interface Manager and manages or runs the front panel display; the "SSA" is the Scanner Service Agent and is the interface between the scanner and the personality or the main printer; and the "Printer PDL" is the Page Description Language which is a high level way to define what a printed page looks like, as will be understood by those of skill in the art. Specifically, communication between the data source or copy processor and the printer SSA and Printer PDL is shown. The copy processor sends the page attributes to the SSA in the "BeginPage" message. The SSA determines the constraint values by inquiring the printer system (e.g. by asking the Printer PDL) and returns them to the copy processor in the "Ready" reply. The Copy Processor uses that information to determine the size and alignment of the image data it will send to the printer. It sends the size and alignment attributes in the "BeginImage" message, so that the printer will know whether to expect constrained raster data. After the printer sends the "Ready" reply, the Copy Processor sends the constrained raster data, and then the printer processes it as described above.

Figure 9:
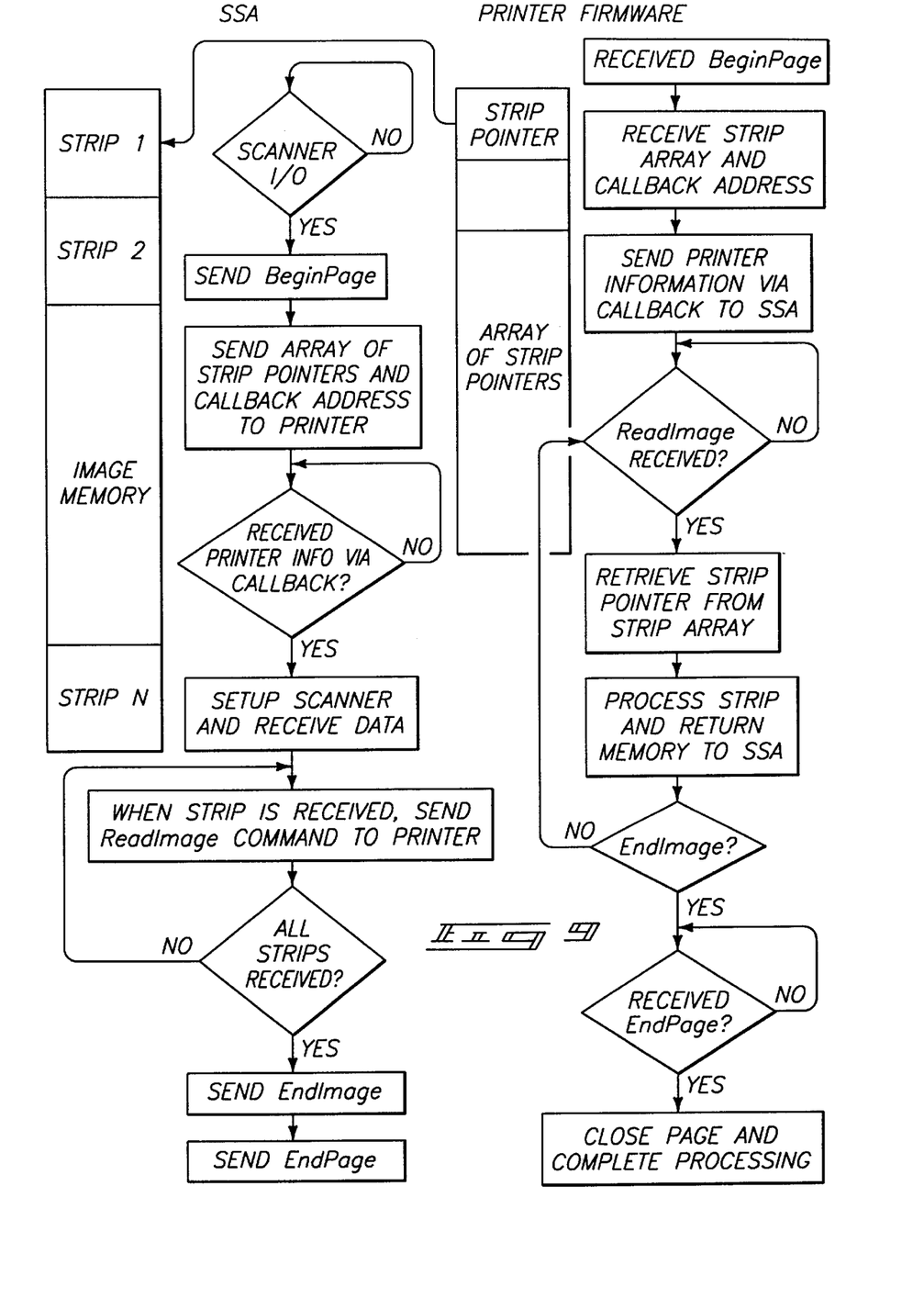
FIG. 9 is a flow diagram illustrating processing which takes place in accordance with certain embodiments of the invention.

To further assist in understanding various embodiments of the invention, the flow diagram of FIG. 9 is provided. FIG. 9 describes processing which takes place on the SSA side (the left side of the figure) and processing which takes place on the printer firmware side (the right side of the figure). The processing which takes place on the SSA side will be described first.

On the SSA side, a BeginPage is sent to the printer firmware, as well as an array of strip pointers and a Callback address. The Callback address enables the printer firmware to communicate with the SSA. The SSA then waits to receive printer information via the Callback address. Next, the scanner is set up and the data is received from the printer. Each time a strip is received, a ReadImage command is sent to the printer. When all strips have been received, an EndImage and EndPage is sent.

On the printer firmware side, the BeginPage is received as well as the strip array and Callback address. Printer information is then sent, via the Callback address to the SSA. The printer then waits to receive the ReadImage command, whereupon the strip pointer from the strip array is retrieved, the strip is processed and memory is returned to the SSA. In like manner, each strip is processed. When the printer receives the EndImage and EndPage commands, the image and page are closed and processing is complete.

In various past systems, data initially stored in the first buffer, such as buffer 46 in FIG. 5, was required to be copied out of the buffer so that the buffer could be returned to the I/O subsystem. One advantage of the present invention is that this requirement can now be removed. Now, the I/O buffer itself (through the handle) can be stored on the display list instead of copying the data. Alternately, the data may be compressed into a new buffer before it is placed on the display list, and the I/O buffer is returned when the compression completes. If the image data is to be spooled to disk because multiple copies are to be made, or the amount of installed printer RAM is limited, it is advantageous to compress the image data.

The image data (handle) is stored on the display list until the engine is ready to print the image on paper. When the paper is in position, an image processor task processes the image data for that page from the display list. It copies or uncompresses the image data directly to the strip buffers. There are a limited number of strip buffers (three is typical) and each strip buffer holds raster data the width of a page and typically 100–200 rows high. The engine task writes the strips to the engine controller.

The image processor task and the engine task have hard real-time constraints, because they must process the strips as fast as the engine controller prints them to paper. On the other hand, there are no hard real-time constraints on the process of building the display list. When data is placed on the display list, it is prerendered if necessary to guarantee that the image processor task can process it fast enough. Since the constrained raster data is already in strip-ready format, one advantage of the invention is that such data can be tagged so that processing time is not wasted on checking to see whether it needs to be prerendered. Advantages of the present invention include that existing printer controllers are able to support much faster raster image data rates than without the various embodiments of the present invention. Various methods of the invention have been used to print 600 dpi, 2 bpp pages at engine speed (32 ppm), whereas without the invention, rates of only 22–24 ppm were achieved.

The protection sought is not to be limited to the disclosed embodiments, which are given by way of example only, but instead is to be limited only by the scope of the appended claims.

What is claimed is:

1. In a peripheral unit that converts image data to page-arranged output, the peripheral unit including a source which provides the image data, and an image pipeline which processes the image data into the page-arranged output, the image pipeline having at least one constraint which affects the image data provided by the source, a method of processing image data comprising:

querying the image pipeline to determine said at least one constraint, said image pipeline being configured to process raster data for driving a laser printer print engine;

imposing, if appropriate, said at least one constraint on said image data to provide constrained image data prior to providing said constrained image data to said image pipeline; and after said imposing, providing said constrained image data from the source to the image pipeline for processing into said page-arranged output.

2. The image data processing method of claim 1, wherein said querying comprises providing a communication link between said source and said image pipeline, said querying taking place over said communication link.

3. The image data processing method of claim 1, wherein said at least one constraint includes a plurality of constraints.

4. The image data processing method of claim 1, wherein the image pipeline includes a display list builder which processes the image data into individual strips having at least one strip parameter, and an image processor which renders the individual strips into a raster bit map, and further wherein said querying comprises determining said at least one strip parameter of the display list builder.

5. The image data processing method of claim 4, wherein said at least one strip parameter comprises a plurality of strip parameters at least one of which comprising a strip dimension.

6. The image data processing method of claim 5, wherein said plurality of strip parameters comprise a strip buffer width and a strip buffer height.

7. In a peripheral unit that converts image data to page-arranged output, the peripheral unit including a source which provides constrained or unconstrained image data, a first buffer for storing the constrained or unconstrained image data, an image pipeline which processes the constrained or unconstrained data into the page-arranged output, and at least one strip buffer for storing page-arranged output, a method of processing image data comprising:

storing image data provided by the source in said first buffer;

assigning a handle to said image data;

passing said handle through at least a portion of the image pipeline; and after said passing, copying at least a portion of said image data which was stored in said first buffer directly into said at least one strip buffer, said copying being the first copying of said image data after said storing of said image data in said first buffer.

8. The image data processing method of claim 7, wherein the image pipeline includes a display list builder which builds a display list describing data which is to be provided into the page-arranged output, and wherein said passing comprises storing said handle on the display list.

9. The image data processing method of claim 8, wherein the display list builder builds a display list comprising a plurality of strips having at least one strip parameter comprising a constraint which affects the image data provided by the source, and further comprising determining said at least one strip parameter prior to passing said handle through said at least a portion of the image pipeline.

10. The image data processing method of claim 9 further comprising using said determined at least one strip parameter and imposing said parameter, if appropriate, on said image data to provide constrained image data.

11. The image data processing method of claim 8, wherein the display list builder builds a display list comprising a plurality of strips having at least one strip parameter comprising a constraint which affects the image data provided by the source, and further comprising determining said at least one strip parameter prior to storing said image data in said first buffer.

12. The image data processing method of claim 9 further comprising using said determined at least one strip parameter and imposing said parameter, if appropriate, on said image data to provide constrained image data.

13. The image data processing method of claim 8, wherein the display list builder builds a display list comprising a plurality of strips having at least one strip parameter comprising a constraint which affects the image data provided by the source, and further comprising querying said image pipeline to determine said at least one strip parameter prior to passing said handle through said at least a portion of the image pipeline.

14. The image data processing method of claim 13 further comprising using said determined at least one strip parameter and imposing said parameter, if appropriate, on said image data to provide constrained image data.

15. A peripheral unit for producing a print media having printed matter thereon comprising:

a source comprising a query processor, the source being configured to provide image data describing an image; and an image pipeline operably coupled with the source and configured to receive image data therefrom and process said image data into a page-arranged output, the image pipeline being configured to process raster data for driving a laser printer print engine, the image pipeline having at least one constraint which affects the image data provided by the source, wherein the query processor is configured to query the image pipeline to ascertain said at least one constraint prior to providing the image data to the image pipeline.

16. The peripheral unit of claim 15, wherein the source is further configured to impose said at least one constraint on the image data prior to providing the image data to the image pipeline.

17. The peripheral unit of claim 15, wherein the image pipeline includes a display list builder apparatus configured to process image data into individual strips having at least one strip parameter, and an image processor which is configured to render the individual strips into a raster bit map, and wherein the query processor is configured to ascertain said at least one strip parameter.

18. The peripheral unit of claim 17, wherein said at least one strip parameter comprises a plurality of strip parameters.

19. The peripheral unit of claim 18, wherein said plurality of strip parameters comprise a strip buffer width and a strip buffer height.

20. The peripheral unit of claim 15 further comprising:

a first buffer coupled with the source and the image pipeline and configured to hold image data provided by the source; and at least one handle assigned to the image data which is held in the first buffer, wherein the image pipeline is configured to pass the handle which describes the image data rather than the image data; and a strip buffer coupled with the first buffer and configured to receive image data directly from the first buffer responsive to passing by the image pipeline.

* * * * *